March 13, 1962 C. B. BRAHM 3,025,418

QUADRATURE STRIPPING CIRCUIT

Filed Dec. 24, 1959 3 Sheets-Sheet 1

INVENTOR
CHARLES B. BRAHM

BY Harris G. Luther
ATTORNEY

March 13, 1962

C. B. BRAHM 3,025,418

QUADRATURE STRIPPING CIRCUIT

Filed Dec. 24, 1959

3 Sheets-Sheet 2

INVENTOR
CHARLES B. BRAHM

BY Harris G. Luther
ATTORNEY

INVENTOR
CHARLES B. BRAHM
BY Harris G. Luther
ATTORNEY 3,025,418

QUADRATURE STRIPPING CIRCUIT

Charles B. Brahm, Ellington, Conn., assignor to United Aircraft Corporation, East Hartford, Conn., a corporation of Delaware Filed Dec. 24, 1959, Ser. No. 861,973

8 Claims. (Cl. 307—88.5)

Figures 1, 2, 7:
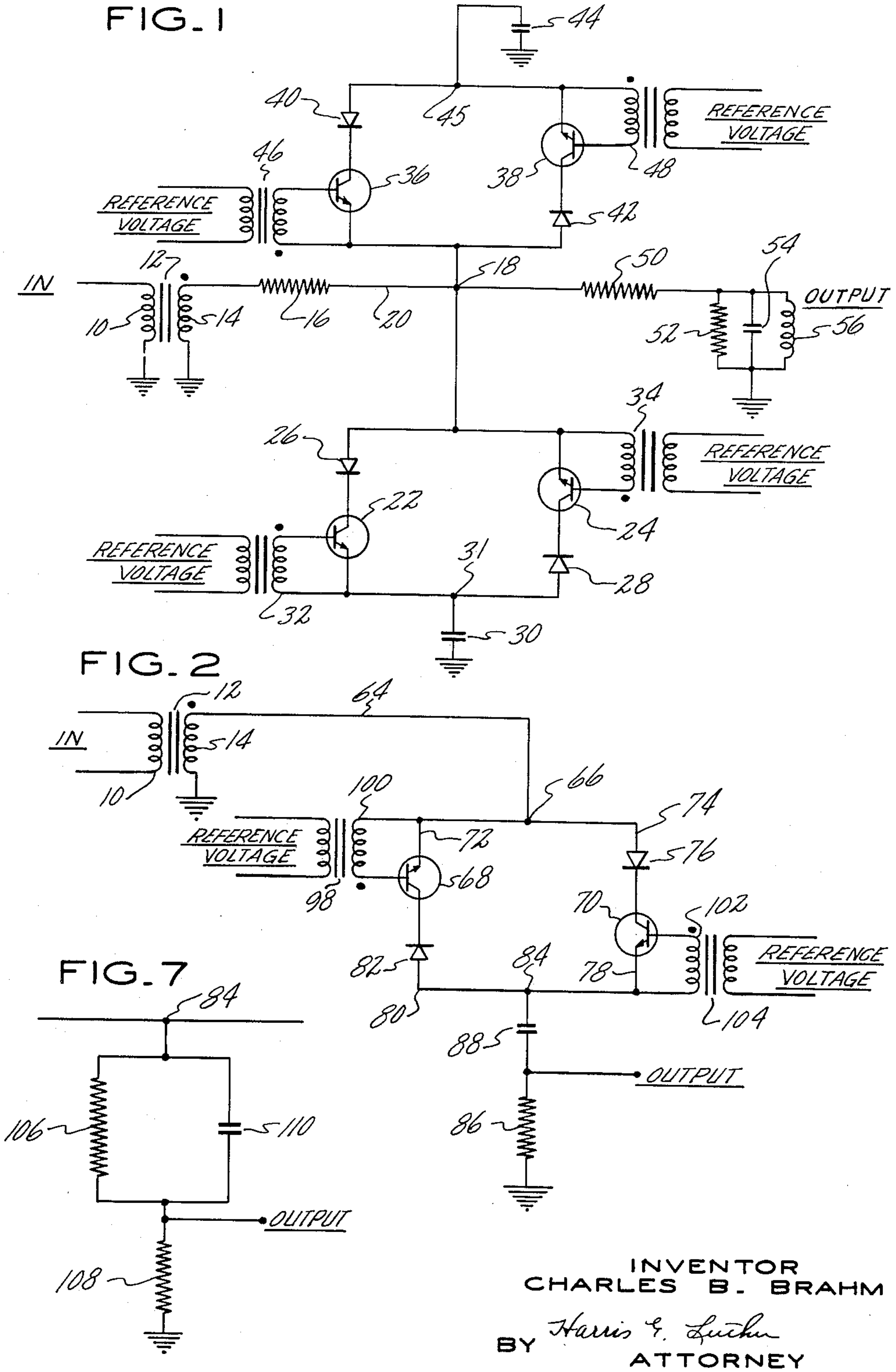

This invention relates to transistor circuits, and particularly to phase sensitive circuits, which will provide gain and phase compensation to A.C. input signals.

A.C. compensation is necessary in most servo systems. Because of space and weight limitations in aircraft, a simple method for compensating the A.C. carrier wave is a necessity. The compensation required will depend upon the needs of the system itself, but for most autopilot or automatic stabilization systems, the simple lag and lead transfer functions are the most common. This invention discloses a simple method for providing the compensation to the A.C. carrier wave directly.

In many A.C. circuits the compensation for carrier-type signals is performed by de-modulating the carrier signal, compensating through D.C. circuitry, and then re-modulating the compensated signal. This method, while satisfactory, is obviously expensive in that additional modulator and de-modulator networks are necessary.

A method of compensation which works directly on A.C. signals is the notched filter method in which an A.C. filter network is designed to compensate only the small range of frequencies near the carrier frequency. This method, while avoiding the extra components necessary in D.C. compensation, is useful only where the frequency of the carrier is relatively stable, and this limitation makes the method impractical in aircraft systems where variations of ±5% are common.

The present invention avoids the disadvantages of the D.C. and notched filter methods of compensation by working directly on the A.C. carrier signal and eliminating the necessity of critical regulation of the carrier frequency by utilizing the switching characteristics of certain devices, as for example semi-conductor devices.

It is therefore an object of this invention to provide a simple and inexpensive circuit for producing compensation to an A.C. carrier signal.

Another object of this invention is to provide a novel circuit utilizing switching devices for producing an A.C. output signal having a desired time response to an A.C. input signal.

A further object of this invention is to provide an A.C. compensation network which utilizes the variable impedance characteristics of semi-conductor devices.

A still further object of this invention is a novel circuit arrangement applying compensation to a rapidly varying A.C. input signal to produce an A.C. output signal proportional to the time integral of the A.C. input signal.

Another object of this invention is a novel circuit arrangement applying compensation to a variable amplitude A.C. input signal to produce an A.C. output signal proportional to the time rate of change of the A.C. input signal.

A further object of this invention is to provide a phase sensitive A.C. compensation circuit where the transfer function is an integral, derivative or proportional signal or a combination thereof.

Figure 3:
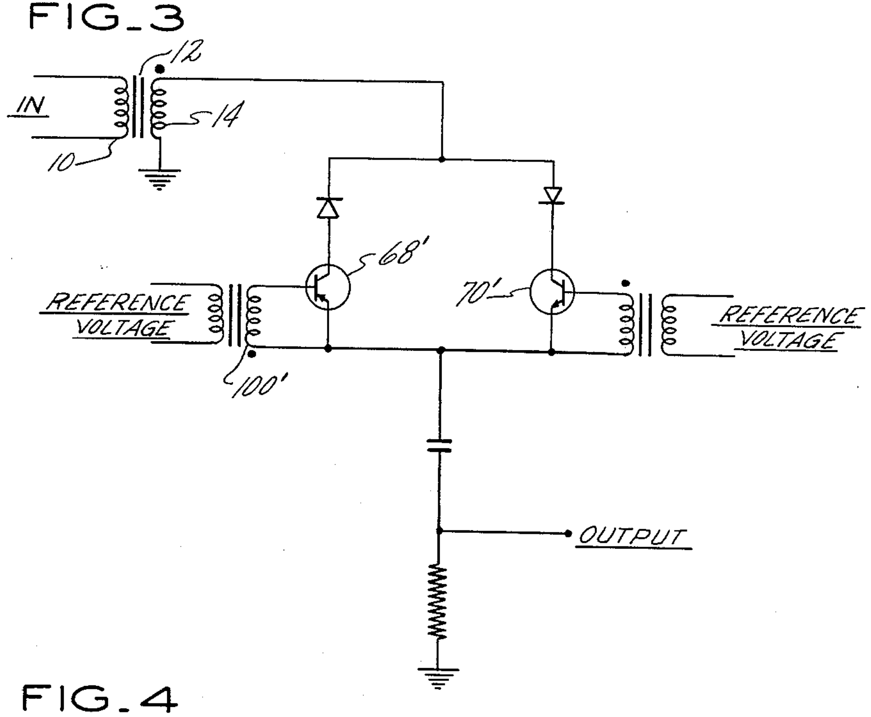
Figure 4:
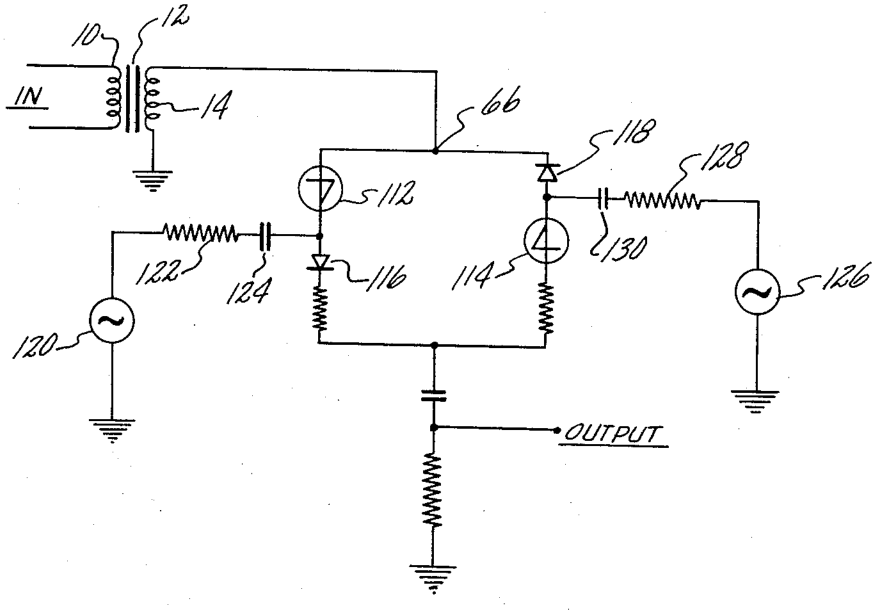
Figure 5:
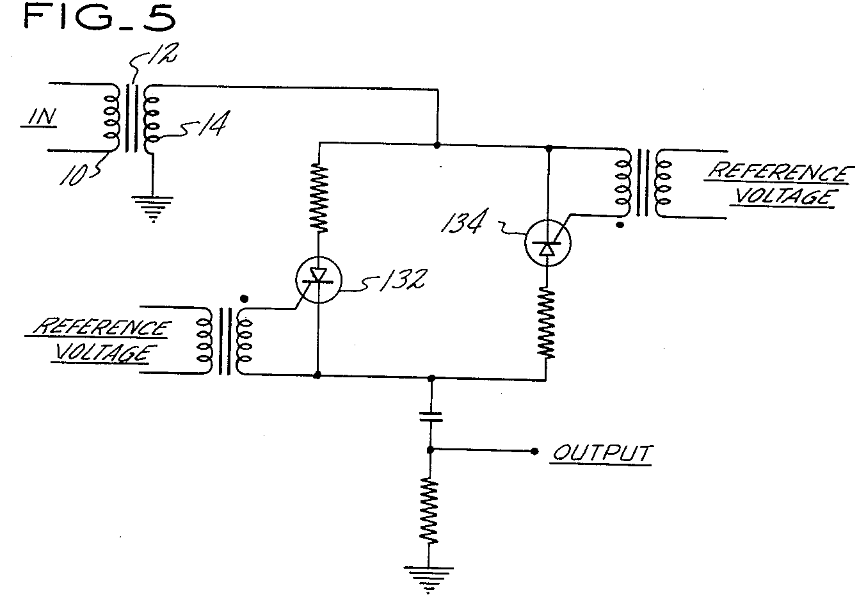
Figure 6:
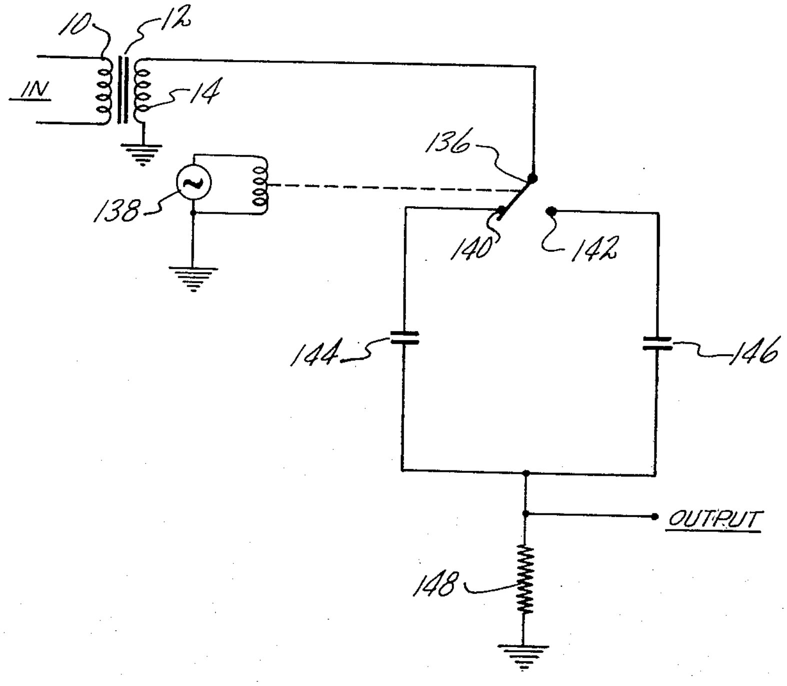

These and other objects and a fuller understanding of the invention may be had by referring to the following description and claims, taken in conjunction with the accompanying drawings in which:

FIG. 1 is a scehmatic electrical representation of a full-wave A.C. lag circuit using transistors as the switching devices; and FIG. 2 is a schematic electrical representation of a half-wave A.C. derivative circuit using transistors as the switching devices; and FIG. 3 is a schematic representation of a half-wave A.C. derivative circuit using both N-P-N and P-N-P transistors; and FIG. 4 is a schematic representation of a half-wave A.C. derivative circuit using Shockley diodes as the switching devices; and FIG. 5 is a schematic representation of a half-wave A.C. derivative circuit using controlled rectifiers as the switching devices; and FIG. 6 is a schematic representation of a full-wave A.C. circuit using an electro-mechanical chopper as the switching device; and FIG. 7 shows a modification of the output circuits used in FIGS. 2, 3, 4 and 5.

Referring now particularly to FIG. 1, an A.C. carrier signal carrying information is received from a preceding stage through winding 10 and is sensed through transformer 12 and secondary coil 14. The carrier wave is conducted through resistor 16 and line 20 to junction 18. A pair of transistors 22 and 24 are connected across the input signal, the transistors being in opposite conducting relationship to each other. Diodes 26 and 28 are connected to allow series current in the collector circuit of transistors 22 and 24 respectively. A capacitor 30 is connected between the junction 31 of the transistors and ground. A pair of coils 32 and 34 are connected across the emitter-base junction of transistors 22 and 24 respectively, and the coils are transformer-coupled to a source of A.C. reference voltage of the same frequency as and in phase with the input signal. Another pair of transistors 36 and 38 is connected across the input signal, with diodes 40 and 42 in the collector circuits of the transistors. Capacitor 44 is connected between the junction 45 of the transistors and ground. A second pair of coils 46 and 48 is placed across the emitter and base of transistors 36 and 38 and the coils are transformer-coupled to a source of A.C. reference voltage of the same frequency as the input signal. The voltage applied to coils 46 and 48 may be from the same source as that applied to coils 32 and 34, but coils 46 and 48 wil receive the reference voltage 180° out of phase with the reference voltage received by transistors 22 and 24 because windings 46 and 48 are wound opposite to windings 32 and 34.

An output circuit comprising a resistance divider circuit including resistors 50 and 52 is connected in series with the input signal. A resonant circuit such as capacitor 54 and inductor 56 may be placed across resistor 52 to shape the output signal.

The A.C. reference voltage connected to coils 32, 34, 46, and 48 is arranged to always be either in phase or 180° out of phase with the input signal, and transistors 22 and 24 will be switched to their low impedance condition and be forward-biased when transistors 36 and 38 are reversed biased and thus non-conducting. Conversely, when transistors 36 and 38 are forward-biased by the A.C. reference signals, transistors 22 and 24 will be turned off. Assuming that the reference signal applied through coils 32 and 34 is in phase with the input signal, transistors 22 and 24 will be conducting during the first half cycle of the input signal. If the envelope of the input signal increases, part of the increase will be conducted through transistor 22 to capacitor 30 during the first half cycle of the input signal, and will thus charge capacitor 30 slightly to a value depending on the amplitude of the input signal and the time constant of the circuit. At this time diode 28 will block the input signal from the path through transistor 24, and transistors 36 and 38 will be turned off by the reverse bias from coils 46 and 48. When the input signal reverses polarity, transistors 22 and 24 will be turned off, and transistors 36 and 38 rendered conductive. A path is now open through capacitor 44, diode 40 and transistor 36 so that capacitor 44 will charge slightly but will have an opposite charge from that of capacitor 30. At this time diode 42 prevents conduction through transistor 38. As the input signal swings back to its positive state, transistors 22 and 24 will be turned on again and capacitor 30 will be charged to a slightly higher value by the input signal, and capacitor 44 will be charged more negatively during the next negative half cycle of the input signal. This action of charging capacitors 30 and 44 will be repeated during each cycle until the capacitors reach a charged value equal to the final magnitude of the input signal. During this time the signal received by the output circuit is a function of the charge across capacitors 30 and 44 and will thus build up exponentially.

If the envelope of the input signal now decreases in magnitude, capacitors 30 and 44 will discharge slowly during each half cycle but the paths will be through transistors 24 and 38. Thus the signal received by the output circuit is the A.C. input signal compensated by a lag introduced by the charging and discharging of capacitors 30 and 44, and the output signal is full-wave and phase sensitive. If the input signal is changed in polarity by 180°, the charging and discharging of capacitors 30 and 44 will take place as described but the polarity of the charge on the capacitors will be reversed and the opposite transistors will conduct.

FIG. 2 refers to a half-wave A.C. derivative circuit in which an amplitude modulated A.C. input signal of preselected frequency is applied to transformer 12 through primary winding 10. Secondary winding 14 senses the A.C. signal and feeds it through line 64 to junction 66. A pair of junction transistors 68 and 70 are connected to conduct in opposite directions and are joined at junction 66 so that the emitter of transistor 68 receive the A.C. signal through line 72 and the collector of transistor 70 receives the A.C. signal through line 74 and diode 76. A line 78 from transistor 70 and a line 80 from transistor 68 and including diode 82 meet at junction 84. An output circuit comprising in series resistor 86 and capacitor 88 is connected between junction 84 and ground. The output signal from the circuit is taken across resistor 86.

A constant amplitude A.C. reference signal having the same frequency as the input signal is applied through transformer 98 to secondary winding 100 which is connected across the emitter and base of transistor 68. The same A.C. reference signal is also applied across the emitter and base of transistor 70 through secondary winding 102 of transformer 104. Secondary windings 100 and 102 are so connected to transistors 68 and 70 that the positive half-cycle of the reference signal feeds the bases of the transistors simultaneously, thus forward biasing each transistor and rendering both conductive at the same time. While the frequency of the reference signal is fixed to correspond to the frequency of the input signal thus determining the rate at which the transistor becomes conductive, the "on" time of each transistor per cycle can be regulated to something less than the full half-cycle during which the transistor receives a forward biasing signal. A simple method of accomplishing this regulation is by including two Zener diodes back to back in series with the reference signal winding, hence blocking the reference signal except when it is near peak amplitude.

Assuming that the reference signal is substantially in phase with the input signal, a constant amplitude A.C. input signal applied through winding 14 will be transmitted through diode 76 and transistor 70 to charge capacitor 88. Only the positive half-cycle of the input signal will charge capacitor 88 because the reference signal will reverse bias transistors 68 and 70 and prevent conduction during the negative half-cycle. If capacitor 88 and resistor 86 have a short time constant, the capacitor will charge rapidly to the peak voltage of the input signal and the capacitor charge current will pass through output resistor 86. After capacitor 88 reaches full charge, no further output signal will result unless there is a change in the amplitude of the input signal. Should the input signal now increase with a constant rate of change, capacitor 88 will charge as a function of successive increases in input signal amplitude and the time constant of the circuit. Since an output signal occurs only when the capacitor charges and discharges, and, since there is a constant rate of increase of charge on the capacitor, the output will be a series of pulses of equal amplitude. If the peak amplitude of the input signal decreases transistor 68 will conduct during the positive half-cycle of the input signal and allow capacitor 88 to discharge through diode 82 and transistor 68 in a series of pulses whose amplitude will again be proportional to the rate of change of peak amplitude of the incoming signal, and the output signal will again be a series of pulses but of opposite polarity from an increasing input signal.

If the input signal is 180° out of phase with the reference signal transistor 68 and diode 82 form the path of signals of increasing magnitude and transistor 70 and diode 76 form the path for signals of decreasing magnitude, and capacitor 88 will be charged and discharged during the negative half cycles of the input signal to a polarity opposite that of the in phase case.

FIG. 7 shows an output circuit which can be used in FIG. 2 in place of the output circuit of capacitor 88 and resistor 86. In FIG. 7 resistor 106 and resistor 108 are series connected to junction 84. A capacitor 110 is placed in parallel with resistor 106. The initial output signal will find capacitor 110 a low impedance and all of the voltage drop will initially be across resistor 108. As capacitor 110 charges a voltage drop will result across the capacitor which will thus decrease the output voltage across resistor 108. As a result the output across resistor 108 will be proportional to the input signal rather than a function of the time rate of change of the input signal.

The half-wave derivative circuit of FIG. 2 can be made into a full-wave derivative circuit. If an additional pair of oppositely connected transistors with their associated circuitry, as shown in FIG. 2, are placed in parallel with the original half-wave derivative circuit, and the reference voltage which is applied to the additional pair of transistors is reversed 180° from that applied to the first pair of transistors 68 and 70, the first pair of transistors will conduct during the positive half cycle of the input signal, and the added pair of transistors will conduct during the negative half of the input signal. An additional capacitor will be placed in series with the second pair of transistors and this additional capacitor will be joined to capacitor 88 so that output resistor 86 will receive both positive and negative half cycle outputs.

FIG. 3 is a half-wave derivative circuit similar to FIG. 2 except that instead of transistors 68 and 70 being both N-P-N or P-N-P transistors, transistor 70′ in FIG. 3 is an N-P-N transistor while transistor 68′ is of the P-N-P type. This necessitates a reversing of the reference voltage winding 100 as shown in FIG. 3 at 100′. Both transistors in FIG. 3 are forward biased simultaneously and the reference voltage will be in phase with or 180° out of phase with the input signal so that an output will be rendered only during the positive half cycle or the negative half-cycle of the input signal.

FIG. 4 shows a modification of the half-wave derivative circuit of FIG. 2 utilizing Shockley four-layer diodes 112 and 114 which are connected in opposite conducting relationship between the input circuit junction 66 and the output circuit. A detailed description of the Shockley four-layer diode, also known as a transistor diode, may be had by referring to Product Engineering, June 15, 1959, pages 27 through 28. Diodes 116 and 118 may be placed in series with the Shockley diodes for isolating the output from the switching signal. A source of A.C. reference voltage 120 is connected through resistor 122 and capacitor 124 to the emitter junction of Shockley diode 112, and a corresponding source of A.C. reference voltage 126 is connected through resistor 128 and capacitor 130 to the emitter of Shockley diode 114. When a negative signal is received by the emitters of the Shockley diodes, the Shockley diodes will conduct and will become low impedance devices. Sources 120 and 126 are connected so as to switch the Shockley diodes into their conductive states simultaneously, and in phase with the input signal. Thus when the positive portion of the input signal reaches junction 66, the Shockley diodes will be conducting and will transmit the input signal through the Shockley diodes to the output circuit. Shockley diode 112 will be utilized for increasing input signals and shockley diode 114 will conduct for decreasing input signals. The output is thus a half-wave output.

FIG. 5 is a half-wave derivative circuit in which a pair of controlled rectifiers 132 and 134 are placed in the circuit to act as the switching elements. The controlled rectifiers, which may be thyratrons or other gaseous rectifiers, will be rendered conductive by energizing the control grid with the A.C. reference voltages in phase with the input signal. Other than the substitution of the rectifying elements 132 and 134, the circuit will react substantially as the circuit of FIG. 2.

FIG. 6 shows an electro-mechanical chopper 136 used as a switching device. A source of alternating voltage 138 will switch the chopper back and forth between junctions 140 and 142 in phase with the input signal. When the switch 136 is connected to junction 140, the input signal will be conducted to charge capacitor 144 while during the opposite half cycle when switch 136 is connected to junction 142 the input signal will be conducted to charge capacitor 146. An output resistor 148 is connected to the junction of capacitors 144 and 146. This circuit will thus render a full-wave derivative output since one of the capacitors 144, 146 will be charged during one half cycle of the input while the other capacitor will be charged during the negative half cycle of the input.

While the invention has been described as relating particularly to A.C. derivative and lag circuits, it is understood that the present disclosure has been made only by way of example, and that changes may be made in the details of construction without departing from the spirit or scope of the invention as hereinafter claimed.

I claim:

1. A circuit for providing full wave A.C. compensation to an A.C. input signal comprising a source of amplitude varying A.C. input voltage, a pair of capacitors connected between said input voltage source and ground, a switching circuit between said input voltage source and each of said capacitors, a source of A.C. reference voltage of the same frequency as said A.C. input voltage connected with each of said switching circuits for biasing each of said switching circuits to a low impedance state in predetermined phase relation with said input voltage and thereby charging and discharging said capacitors as a function of the amplitude variations of said input voltage when said switching circuits are in their low impedance states, one of said switching circuits being biased to its low impedance state substantially in phase with said input voltage, the other of said switching circuits being biased to its low impedance state substantially 180° out of phase with said input voltage, and an output circuit responsive to the charge on said capacitors for providing an A.C. output signal which is a function of said input voltage as compensated by said full wave compensation circuit.

2. An A.C. circuit as in claim 1 in which said output circuit is connected across said capacitors whereby said A.C. output signal is proportional to the time integral of said A.C. input voltage.

3. An A.C. circuit as in claim 2 in which said output circuit includes a resistor connected in series with said capacitors, said A.C. output signal being taken across said resistor and being proportional to the time rate of change of said A.C. input voltage.

4. An A.C. circuit as in claim 2 in which semi-conductor elements are utilized in said switching circuit.

5. An A.C. circuit as in cliam 4 in which each of said switching circuits includes a pair of transistors connected in parallel.

6. An A.C. circuit as in claim 5 in which one of said transistors is an n-p-n type of transistor, and the other of said transistors is a p-n-p type transistor.

7. An A.C. circuit as in claim 4 in which said semi-conductor elements include four-layer diodes.

8. An A.C. circuit as in claim 4 in which said semi-conductor elements include controlled rectifiers.

References Cited in the file of this patent

UNITED STATES PATENTS

| | | |
|---|---|---|
| 2,532,338 | Schlesinger | Dec. 5, 1950 |
| 2,841,707 | McCulley | July 1, 1958 |
| 2,914,684 | Essler | Nov. 24, 1959 |

OTHER REFERENCES

Waveforms, Chance et al., McGraw-Hill Book Co., 1949, pages 49, 50, 373.